June 4, 1935.    R. R. RAND, JR    2,003,975
AMPHIBIAN AEROPLANE
Filed Jan. 14, 1932    10 Sheets-Sheet 1

*INVENTOR*
RUFUS R. RAND JR.
BY
*ATTORNEYS*

June 4, 1935.　　　　R. R. RAND, JR　　　　2,003,975
AMPHIBIAN AEROPLANE
Filed Jan. 14, 1932　　　10 Sheets-Sheet 5

INVENTOR
Rufus R. Rand Jr
BY
ATTORNEY

June 4, 1935.  R. R. RAND, JR  2,003,975
AMPHIBIAN AEROPLANE
Filed Jan. 14, 1932   10 Sheets-Sheet 7

INVENTOR
RUFUS R. RAND JR.
BY
ATTORNEY

Patented June 4, 1935

2,003,975

UNITED STATES PATENT OFFICE 2,003,975

AMPHIBIAN AEROPLANE

Rufus R. Rand, Jr., Wayzata, Minn.

Application January 14, 1932, Serial No. 586,597

11 Claims. (Cl. 244—14)

This invention relates to an aeroplane. While many of the features of the invention can be used in either a land plane or a hydroplane, in the embodiment of the invention illustrated the aeroplane of this invention as shown is of the amphibian type the same thus being capable of landing on and taking off from either land or water.

It is desirable in an aeroplane to have a supporting structure for the hull and wings, as well as for the motor and other necessary parts, which is of maximum strength and of minimum weight.

It is also desirable to have the concentrated loads compactly arranged and so that the center of gravity of the plane is quite low. This gives great stability, preventing lateral tipping when the plane is on the water, eliminating the tendency to nose over when the plane is alighting on the land and making the plane easy to maneuver.

It is also desirable in a plane to have the parts forward of the pilot and passengers unobstructed, and to have the propeller in the rear of the pilot and passengers.

It is also desirable to have the propeller at a sufficient height, so that there will be no slip stream over the fuselage and the resistance of the air to the plane will be lessened and a high efficiency of propeller action obtained.

It is also desirable from the standpoint of appearance and performance to have the plane arranged with smooth lines or surfaces and a minimum of projecting parts.

It is an object of this invention, therefore, to provide an aeroplane having a hull or fuselage, a propeller, a propeller support and a motor, said propeller being disposed entirely above the remainder of the plane save the propeller support, together with means for driving said propeller from said motor.

It is a further object of the invention to provide an aeroplane having a hull or fuselage, a wing extending transversely above said hull, a propeller disposed entirely above said wing and rotatable about a horizontal axis, a motor disposed below the top of the wing, together with means for driving said propeller from said motor.

It is an object of this invention, also, to provide an aeroplane of the amphibian type having the hull designed to move efficiently in or on the water, and having landing gear comprising wheels, which wheels are retractible into the hull when the plane is to alight on or move on the water.

It is still another object of the invention to provide an aeroplane having a hull, a motor disposed quite low within said hull to give a low center of gravity, a propeller disposed above the hull and wing, and transmission mechanism for driving said propeller from said motor.

It is a further object of the invention to provide an aeroplane having a central frame, a motor suspended from said frame, a hull suspended from said frame, and wings having frames secured at either side respectively to said frame.

It is also an object of the invention to provide an aeroplane as set forth in the preceding paragraph, together with an auxiliary frame secured rigidly to said motor and extending from said frame, a propeller carried by said auxiliary frame, and means for driving said propeller from said motor.

It is still another object of the invention to provide an aeroplane comprising a frame, a hull carried by said frame, a motor suspended from said frame and disposed within said hull, an auxiliary frame secured to and extending upwardly from said motor, a propeller shaft carried at the upper end of said auxiliary frame, and means extending from said motor to said shaft for driving the same.

It is a further object of the invention to provide an aeroplane as set forth in the preceding paragraph, the same having a casing surrounding the upper part of said auxiliary frame, which may be narrow and of stream-line shape, and extending from the top of the hull to and above the propeller shaft, a propeller being disposed in the rear of this casing.

It is also an object of the invention to provide an aeroplane having a hull of general stream-line shape with continuous lines or surfaces at the sides thereof, said hull having compartments within its sides adapted to receive the landing wheels when retracted, said hull having a main compartment which is water-tight and independent of said first mentioned compartments.

It is also an object of the invention to provide an aeroplane having a frame, a hull, together with novel and efficient means for suspending the hull from said frame.

It is still another object of the invention to provide an aeroplane having a light and simple frame, means for suspending the power plant including the propeller drive and support from said frame including resilient means between said frame and power plant, whereby vibration is lessened.

It is more specifically an object of the invention to provide an aeroplane having a hull construction of great strength and yet which is quite light in weight, said hull being supported by a truss frame of novel and efficient design, said plane having a landing gear of novel form with novel means for retracting the same into a compartment in the hull, together with novel means for opening and closing said compartment.

These and other objects and advantages of the invention will be fully set forth in the following description made in connection with the accompanying drawings, in which like reference characters refer to similar parts throughout the several views and in which:—

Figure 1:
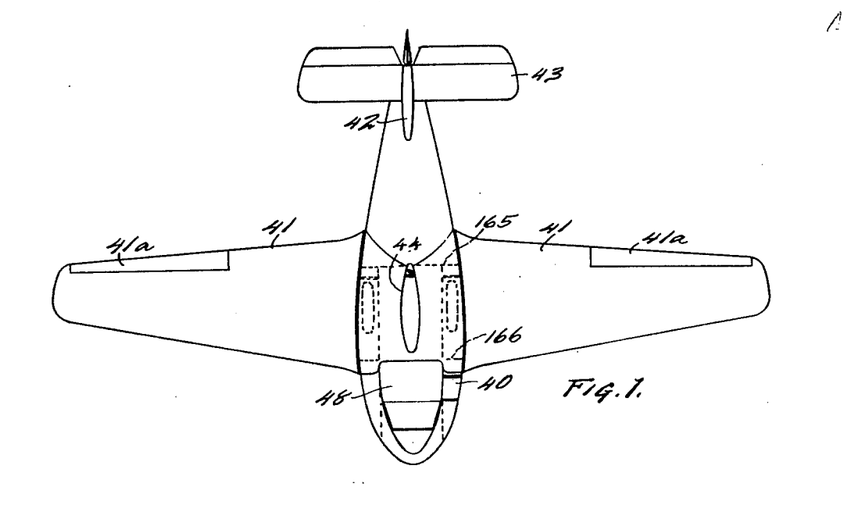
Fig. 1 is a top plan view of the aeroplane.
Figure 2:
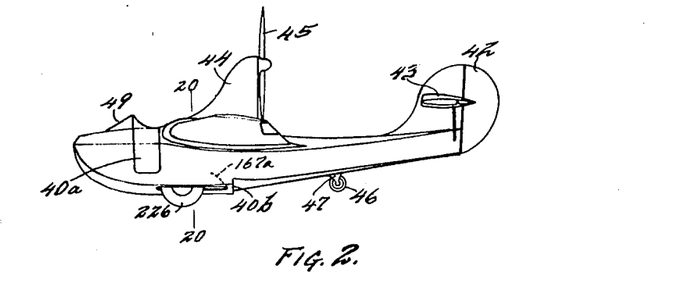
Fig. 2 is a view in side elevation of said aeroplane.
Figure 3:
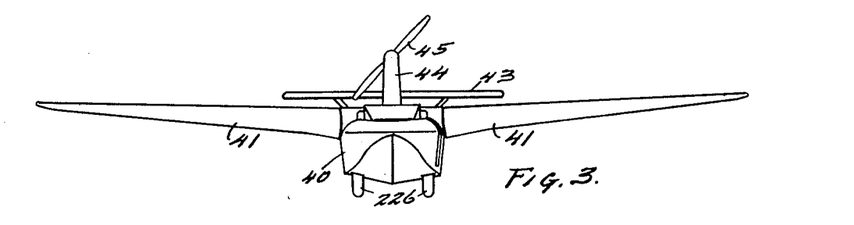
Fig. 3 is a view in front elevation of said aeroplane.
Figure 4:
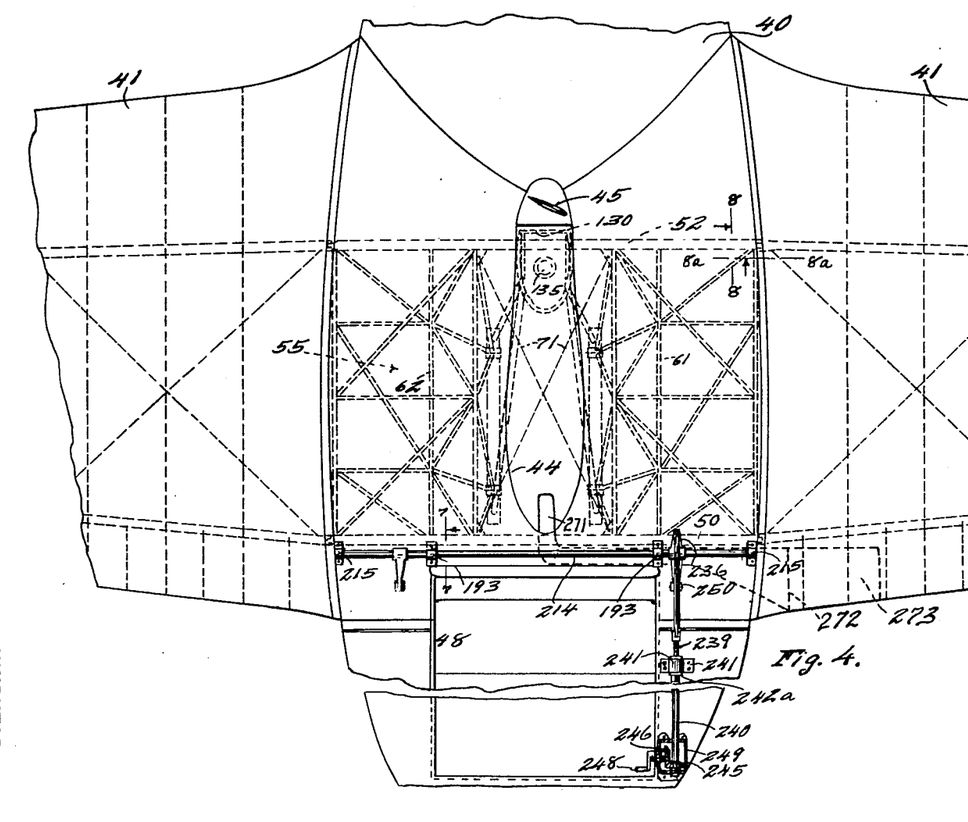
Fig. 4 is a partial plan view shown on an enlarged scale.

Referring to the drawings, particularly Figs. 1 to 3, an aeroplane is shown comprising a hull referred to generally as 40 and having wings 41 extending at either side thereof, and it will be noted, as clearly shown in Fig. 3, that the top wing surface over the hull is continuous with the top surface of the wings at the sides of the hull and in substantially the same plane. The wings 41 are shown as having the ailerons 41a. The plane also has the vertical tail rudder 42 and the horizontal stabilizer 43. A tower 44 of narrow stream-line shape rises from the top and central part of the hull or top of the wing and carries at its upper rear side the propeller 45. A rear landing wheel 46 is shown at the central bottom portion of the hull, the same being carried on a bracket 47, said wheel being partially recessed in said hull. The hull forward of the tower 44 has a cockpit 48 having a windshield 49 at the front thereof, the same being entered by a door 40a in the side of the hull which is hinged at one vertical side thereof.

The hull 40 is secured to and supported by a main frame illustrated in Figs. 4, 5, 9, 10, 11 and 33. This frame is disposed in the central part of the wing over the hull. It is formed of trusses or beams and comprises four main members 50, 51, 52 and 53 which are parallel and spaced to form a quadrilateral. Members 50 and 51 are in the same vertical plane and located at the forward end of the frame, while members 52 and 53 are also in the same vertical plane and disposed at the rear of the frame, and are somewhat closer together than members 51 and 52. Member 53 is also at a slightly lower point than member 51. Said main frame will be designated as a whole as 55. While members 50 to 53 might be of different forms, in the embodiment of the invention illustrated they are shown as made of tubes. Members 50 and 52 are connected by parallel members 56, 57, 58 and 59. The members 56, 57, 59 and 58 are spaced substantially equally, the space between members 57 and 59 being slightly greater than the space between the others. Members 56 to 59 are also illustrated as tubular in form and they are welded securely to members 50 and 52. Members 51 and 53 are connected by four parallel members 60, 61, 62 and 63. It will be seen that members 61 and 62 are spaced much farther apart than are members 57 and 59. Members 60 to 63 are also illustrated as tubes and these are welded securely to members 51 and 53. It may be stated that gusset plates such as shown at the junction of members 57 and 52 and designated 64, are used at the junctions of tubes connecting members 50 and 52 and members 51 and 53 and at other places where the tubes are welded together, these gusset plates not being shown in most instances. The members 58 and 59 are connected substantially midway between members 50 and 52 by member 65 extending parallel to members 50 and 52 and members 58 and 59 are further connected by the diagonal members 66 and 67 extending from opposite ends respectively of members 65 to the opposite corners of the rectangle formed by members 50, 52, 58 and 59. The members 66 and 67 are thus parallel. Members 65, 66 and 67 are also shown in the form of tubes and these are welded securely to the tubes at their ends. Members 56 and 57 are likewise connected by the member 68 extending parallel to and midway between members 50 and 52 and diagonal members 69 and 70 analogous to members 66 and 67 also extend from the opposite ends of member 68 to opposite corners of the rectangle formed by members 50, 52, 56 and 57. It will be noted that members 69 and 70 extend in opposite directions to members 66 and 67. The gusset plates 64 are connected by strong wire members 71 extending diagonally of the rectangle formed by members 50, 52, 57 and 59. Members 62 and 63 at the bottom of the frame are connected by tubes 72 extending parallel to members 51 and 53, said tubes being welded to the tubes 62 and 63. A diagonal tube 73 extends from the junction of the forward tube 72 and tube 63 forwardly and inwardly to the junction of the rear tube 72 and tube 62. Other diagonal tubes 74 are provided, the forward one of which extends from the junction of the forward tube 72 and tube 63 forwardly and inwardly to the junction of tubes 62 and 51. The rear diagonal tube 74 extends from the junction of the rear tube 72 and tube 62 rearwardly and outwardly to the junction of the tubes 63 and 53. Tubes 75 corresponding to tubes 72 extend between tubes 60 and 61, being welded securely thereto at their ends. The diagonal tube 76 corresponding to tube 73 extending oppositely thereto extends between the inner end of the forward tube 75 to the outer end of the rear tube 75, the same being securely welded at its end to tubes 60 and 61. Diagonal tubes 77 corresponding to tubes 74 are provided, the rear one of which extends from the lower outward corner of the frame formed by tubes 60 and 53 inwardly and forwardly to the junction of tubes 75 and 61. The front diagonal tube 77 extends from the junction of tube 61 and tube 51 rearwardly and outwardly to the junction of tube 75 and tube 60. It will be seen from the description already made and that to follow, that frame 55 is symmetrical about a line drawn midway between and parallel to tubes 56 and 58. A tube 78 extends from the junction of tubes 57 and 52 downwardly and outwardly to the junction of tubes 62, 72, and 74. A corresponding tube 79 extends from the junction of tubes 59 and 52 downwardly and outwardly to the junction of tubes 61, 75 and 77. Another tube 80 extends from the junction of tubes 57 and 68 downwardly, outwardly and rearwardly to the junction of tubes 62, 72 and 74, and a corresponding tube 81 extends downwardly, outwardly and rearwardly from the junction of tubes 59 and 65 to the junction of tubes 61, 75 and 77. Tubes 80 and 81 are welded securely to the tubes 61 and 62 respectively at their lower ends and to the tubes 57 and 59 respectively at their upper ends. Another tube 82 extends from the under side of tube 57 substantially at the junction of tube 68 therewith, downwardly, outwardly and forwardly to tube 62 at the junction of tube 72 therewith. The corresponding member 83 extends from the under side of tube 59 substantially at the junction therewith of tube 65 downwardly, outwardly and forwardly to tube 61 substantially at the junction of tube 75 therewith. Another tube 84 extends from the junction of tubes 50 and 57 downwardly and rearwardly to tube 62 substantially at the junction of tube 72 therewith. The corresponding tube 85 extends from the junction of tubes 59 and 50 downwardly, outwardly and rearwardly to tube 61 substantially at the junction of tube 75 therewith.

Four split or cap bearings 86 are provided, disposed within and somewhat below the tubes 62 and 61 and the tube 87 extends from the under side of tubes 57 and 52 substantially at the junction thereof downwardly, inwardly and forwardly to a bearing 86. A corresponding tube 88 on the other side of the frame extends from the under side of the tubes 59 and 52 substantially at the junction thereof downwardly, inwardly and forwardly to a bearing 86. Another tube 89 extends from the under side of tube 57 substantially at the junction of tube 68 therewith downwardly, inwardly and rearwardly to bearing 86. The corresponding tube 90 at the other side of the frame extends from the under side of tube 59 substantially at the junction of tube 65 therewith inwardly and rearwardly to a bearing 86. A tube 91 extends from tube 62 substantially at the junction of tubes 72, 74, 78 and 80 therewith inwardly and slightly forwardly and downwardly to bearing 86. A tube 95 extends from the under side of tube 57 substantially at the junction of tube 68 therewith downwardly, inwardly and forwardly to bearing 86 and a corresponding tube 96 at the other side of the frame extends from the under side of the tube 59 substantially at the junction of tube 65 therewith downwardly, inwardly and forwardly to a bearing 86. A tube 97 extends from tube 62 substantially at the junction of tubes 72, 73, 82 and 84 therewith inwardly and slightly downwardly and forwardly to a bearing 86 and a corresponding tube 98 on the other side of the frame extends from tube 61 substantially at the junction of tubes 75, 76, 83 and 85 therewith inwardly and slightly forwardly and downwardly to a bearing 86. A tube 99 extends from the junction of tubes 57 and 50 downwardly, inwardly and rearwardly to a bearing 86 and a corresponding tube 100 extends from the junction of tubes 59 and 50 rearwardly, downwardly and inwardly to a bearing 86. It will be noted that each bearing 86 has three supporting tubes extending thereto. These three tubes form a tripod which support said bearing from the frame 55. The tubes extending to the bearing have plates 86a welded thereto which are curved into semi-cylindrical shape to form the bearing 86, the same having the horizontal flanges 86b. The cap of bearing 86 is formed by a plate 86c of semi-cylindrical form having a flange 86d overlying the flange 86b and also having a central vertical plate 86e. Plate 86a also has a vertical plate 86f which extends along the outer side of and is welded to the tube 91 or the lower tube extending to the bearing. Gusset plates 93 are also shown between the tubes converging at bearing 86. The cap 86c of the bearing is secured thereto by headed and nutted bolts 94.

It will be seen that when caps 86c are removed, members 109 and 110 can be lifted vertically and will clear the frame pieces 87, 89 and 91.

The main frame proper also includes a tube 101 extending from the under side and one end of tube 50 downwardly and inwardly to tube 51 substantially at the junction of tube 62 therewith, and a tube 101a extends from the under side of tube 50 substantially at the junction of tube 57 therewith downwardly and outwardly to tube 51 substantially at the junction of tube 62 therewith. Tubes 101 and 101a are thus in vertical alinement with tubes 50 and 51. Corresponding tubes 102 and 103 extend downwardly from the under side of tube 50 substantially at the junction therewith of tubes 59 and 58 to tube 51 substantially at the junction therewith of tube 61. Tubes 104 and 105 at the rear end of the frame extend from the under side of tube 52 substantially at the junctions therewith of tubes 56 and 57 respectively downwardly to tube 53 substantially at the junction therewith of tube 62. Corresponding tubes 106 and 107 extend from the under side of tube 52 substantially at the junctions therewith of tubes 58 and 59 downwardly to tube 53 substantially at the junction therewith of tube 61. The main frame 55 also includes vertical members 108 at the four corners thereof which extend between members 52 and 53 at the rear and between members 50 and 51 at the front. These members, like the other members of the truss are formed of tubes and are welded securely at their ends to members 50, 51, 52 and 53. The side of the main frame formed between members 58, 60 and 108 has truss members 108a therein, two of which extend from the corners of said side at the junction of tubes 108 and 58 downwardly to tube 60 substantially at the junction therewith of tubes 75. The other or inner members 108a extend from member 58 substantially at the junction therewith of tube 65 downwardly in diverging relation to tube 60 adjacent the ends of the other tubes 108a. The side of the main frame formed by members 108, 56 and 53 also have truss members 108b therein, the outer ones of which extend from the corners of the frame and tube 56 downwardly in converging relation to tube 63 substantially at the junction therewith of tubes 72. The other or inner members 108b extend from tube 56 substantially at the junction therewith of tube 68 downwardly in diverging relation to tube 63 adjacent the ends of the other tubes 108b. It will thus be seen that the main frame 55 is a rigid openwork frame having trusses at its four vertical sides and having trusses at its top and bottom at either side, disposed in the plane of its top and bottom members. There are also inclined truss frames inwardly of the side trusses, which inclined trusses extend between members 57 and 62 on one side and 59 and 61 on the other side. The truss at the front of the frame including members 50 and 51 is made rigid by strong wires 102a which extend respectively between tubes 50 and 51 and diagonally between the ends of members 101a and 103. The vertical truss at the rear of the frame is likewise made rigid by strong wires 104a which extend between tubes 52 and 53 and diagonally between the ends of tubes 105 and 107. The bearings 86 receive tubular members 109 to which reference will later be made.

Figures 5, 6, 7, 8, 8A:
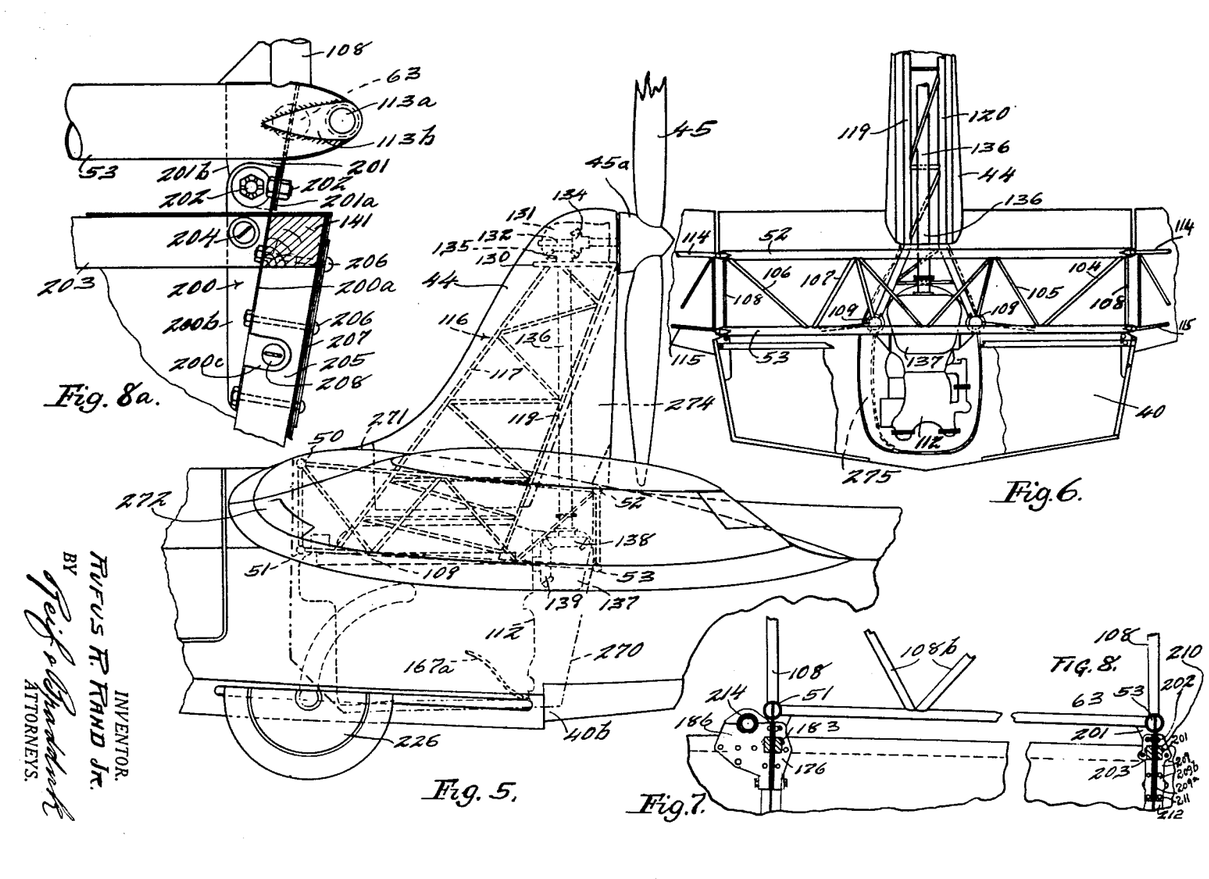
Fig. 5 is a partial view in side elevation shown on an enlarged scale.
Fig. 6 is a partial view in rear elevation with some parts broken away, also shown on an enlarged scale.
Fig. 7 is a vertical section on line 7—7 of Fig. 4, as indicated by the arrow.
Fig. 8 is a vertical section taken on line 8—8 of Fig. 4, as indicated by the arrow.
Fig. 8a is a vertical section taken on line 8a—8a of Fig. 4.
Figures 10, 11, 12, 13, 14, 15, 16:
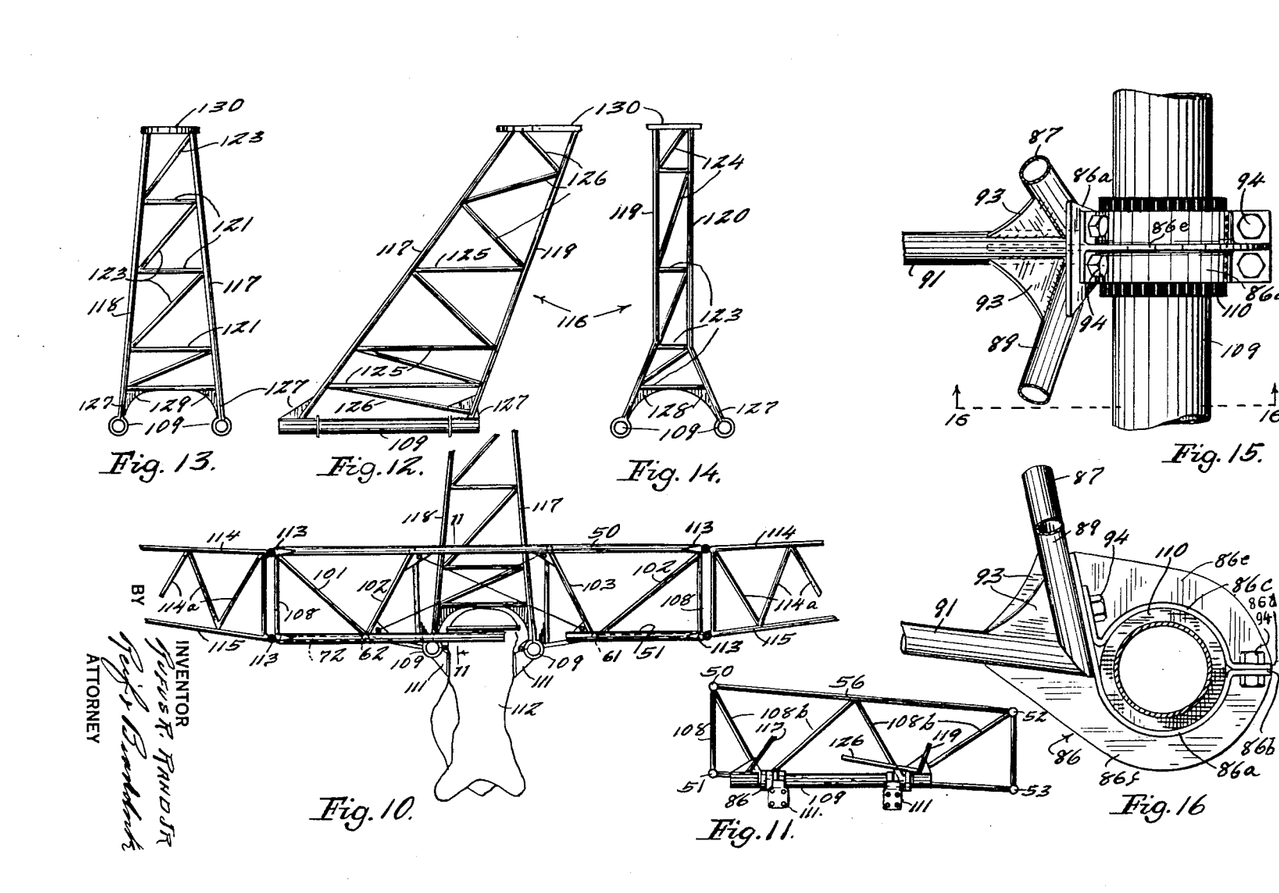
Fig. 10 is a front view of the frame structure, a part thereof being broken away.
Fig. 11 is a vertical section showing the main frame taken on line 11—11 of Fig. 10, as indicated by the arrow.
Fig. 12 is a view in side elevation of the auxiliary frame.
Fig. 13 is a view in front elevation of the auxiliary frame.
Fig. 14 is a view in rear elevation of the auxiliary frame.
Fig. 15 is a top plan view of the supporting bearing structure for the motor.
Fig. 16 is a section on line 16—16 of Fig. 15, as indicated by the arrow, Figs. 15 and 16 being shown on an enlarged scale.

As shown in Figs. 5 and 10, the main frame 55 is above the hull proper and forms the framework for the central portion of the wing. The central portion of the wing might be called the trunk portion of the aeroplane. The main frame within this trunk portion carries all of the load and all of the load stresses, and practically all other stresses are transmitted to this frame. The side sections of the wing or wings 41 also have truss frames therein which extend from each side of and are rigidly connected to frame 55.

Figure 9:
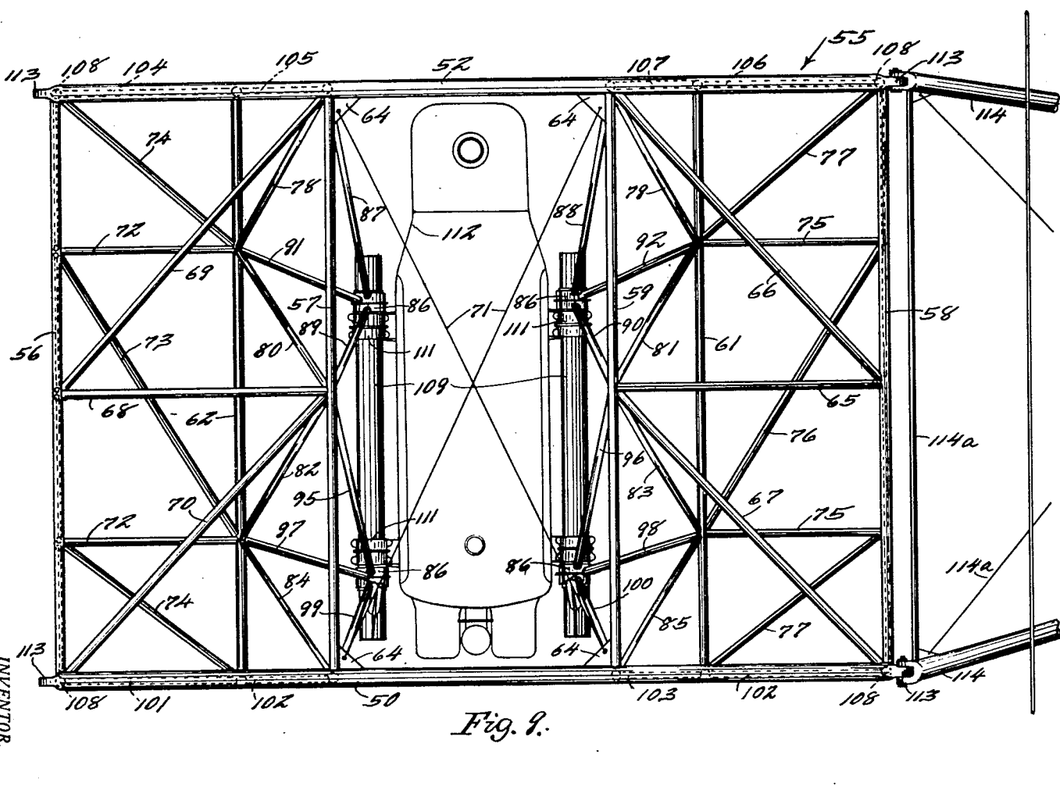
Fig. 9 is a top plan view of the frame used, also showing the motor and motor support.

The frame 55 has lugs 113 projecting laterally at the ends of members 50, 51, 52 and 53 and these lugs are embraced by the bifurcated ends of tubular truss members 114 and 115 as indicated in Figs. 9 and 10. Said members 114 and 115 form the top and bottom members respectively of the wing frames or trusses, the intermediate members of which are indicated at 114a in Fig. 10 and need not be further described. The wings are thus connected to and supported from the frame 55, the wing trusses being rigid and being connected to the frame at four spaced points and thus being rigid therewith.

The hollow shafts or tubes 109 extend in parallel relation, and tubular bushings 110 are disposed between bearings 86 and tubes 108 thus surrounding said tubes, members 110 being made of resilient material such as rubber. The members 109 are also embraced by bearings or lugs 111 which are also split or capped and are secured to the sides of a motor 112. The motor 112 is thus supported by and suspended from the frame 55 and hangs quite a distance below the frame as shown in Fig. 10. It will also be seen that there is resilient connection between the frame and the motor. Motor 112 is, of course, of the internal combustion type and while different types of motors might be used, in the embodiment of the invention illustrated, a motor having vertical cylinders and a horizontal crank shaft is illustrated.

An auxiliary frame designated generally 116 is provided, and this frame is rigidly connected to the tubular members or shafts 109 carried by said main frame and this frame is thus connected to motor 112. Frame 116 comprises four upwardly extending and converging corner pieces 117 and 118 and 119 and 120, which members are welded at their lower ends to members 109. The forward members 117 and 118 which are also in the form of tubes, extend upwardly and rearwardly in converging relation and are connected by a series of horizontal members 121 welded thereto at their ends. Members 117 and 118 are also connected by the diagonal members 123 which, like members 121, are in the form of tubes and are welded to members 117 and 118 substantially at the junction therewith of members 121. Members 119 and 120 at the rear of the frame are also connected by the horizontal cross members 123 which are also in the form of tubes and welded to said members at their ends. It will be seen that the members 119 and 120 converge from members 109 to the second cross member 123 and then extend upward in parallel relation. Members 119 and 120 are also connected by the diagonal members or tubes 124 which are welded thereto at their ends closely adjacent the ends of horizontal members 123. The pair of members 117 and 119 and the pair of members 118 and 120 are respectively connected by the horizontal members 125 and the diagonal members 126 also in the form of tubes and welded to said pairs of members at their ends. Members 117, 118, 119 and 120 as stated are welded to members 109 and gusset plates 127 are provided, set into and welded into said members and members 109. Gusset plates 128 are also set into members 119 and 120 and welded thereto and to members 109 as well as to the lower horizontal member 123. Gusset plates 129 are also set into and welded to members 117 and 118 as well as to the members 109 and also are set into and welded to the lower cross member 121. The frame 116 has at its top the U-shaped plate 130 shown in Figs. 4 and 12 to 14. Tubes 117, 118, 119, 120, 124 and 126 are welded at their upper ends to plate 130. A bracket 131 is bolted to plate 130 at the top of auxiliary frame 116, which bracket has bearings therein in which is journaled a shaft 132 to which the hub 45a of a propeller 45 is secured. Shaft 132 carries a beveled gear 134 meshing with the beveled gear 135 in turn secured to a vertical shaft 136. Shaft 136 is journaled in a bracket 137 secured to the rear of motor 112 and has secured to its lower end a beveled gear 138. Beveled gear 138 meshes with a beveled gear 139 secured to the crank shaft of the motor 112. Propeller 45 is thus driven through gears 138 and 139, shaft 136 and gears 134 and 135. Frame 116 thus forms a partial support for this drive transmission and for the propeller 47. Frame 116, of course, also forms the frame work for the tower 44.

Figures 20, 21, 22, 23, 24, 25, 26, 27:
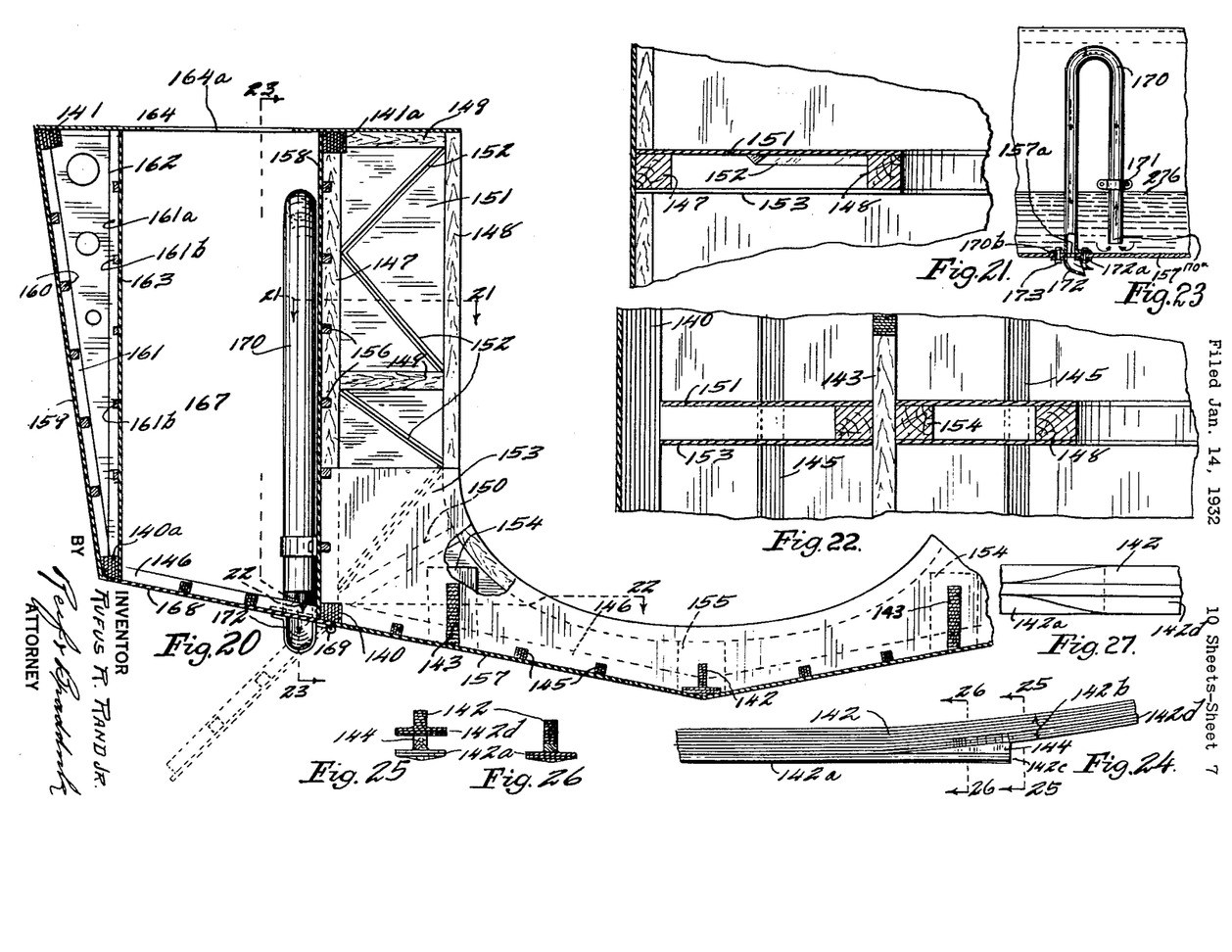
Fig. 20 is a partial transverse section of the hull taken substantially on line 20—20 of Fig. 2.
Fig. 21 is a horizontal section taken on line 21—21 of Fig. 20, as indicated by the arrows.
Fig. 22 is a horizontal section taken on line 22—22 of Fig. 20, as indicated by the arrows.
Fig. 23 is a vertical section taken on line 23—23 of Fig. 20, as indicated by the arrows.
Fig. 24 is a view in side elevation of the keel structure.
Fig. 25 is a vertical section taken on line 25—25 of Fig. 24, as indicated by the arrows.
Fig. 26 is a vertical section taken on line 26—26 of Fig. 24, as indicated by the arrows.
Fig. 27 is a top plan view of Fig. 24.
Figure 34:
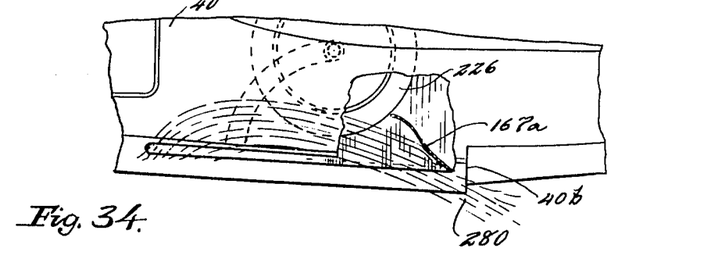
Fig. 34 is a view partly in side elevation and partly in vertical section, illustrating the deflector in the wheel pocket.

The hull 40 comprises longitudinally extending frame members 140 and 140a, members 140a being at the lower corners of the hull as shown in Fig. 20 and members 140 being at the bottom some distance from the members 140a. Similar members 141 and 141a extend longitudinally of the hull at the upper portion thereof, member 141 being at the upper outer corner and member 141a being disposed some distance inwardly of member 141. A central keel member or keelson 142 extends longitudinally of the hull at the bottom central part thereof and keelsons 143 extend longitudinally of the hull also at the bottom at equal distances at each side of the keel 142. The members 140 to 143 are preferably made from laminated wood. The keel 142 comprises a lower wood portion 142a and a vertical rib-like portion upstanding therefrom at the center thereof. The hull 40 is provided with an offset or step 40b some distance in front of the rear portion of the tower 44 and the structure of the keel at this step portion is shown in Figs. 24 to 27. In Fig. 24 the laminations are shown and it will be seen that the top group of laminations 142b are continuous. The lower portion 142a of the keel is cut off as shown at 142c and a wedge 144 of the width of the upper portion of the keel is driven forwardly into the keel between the lower portion 142a and the upper narrow portion. The lower group of laminations 142d is widened out as shown in Fig. 27 to form the lower portion of the keel from the stop 40b rearwardly. The laminations 142b and 142d are thus continuous and are not interrupted by the step 40b. The hull also comprises spaced longitudinally extending members or battens 145 also of laminated structure and transversely extending members 146 of laminated structure which are cut out to receive the longitudinally extending members 145. The hull has extending transversely thereof at intervals, bulkheads, one of which is shown in Fig. 20. The section in Fig. 20 is taken through a portion of the hull containing the wheel pocket and the bulkhead therefore does not extend entirely to the outer side of the hull. The bulkhead comprises the outer vertical members 147 and the inner members or bow 148, the latter being of U-shape and extending around the central part of the hull forming a recess in which is disposed the motor 112. Forward of the motor, bow 148 is omitted and the space between members 147 at each side will form the cockpit, a floor (not shown) being built some distance above the keel 142. At the rear of the motor 112 bow 148 is also omitted and top member 149 and plate or board 151 extend from side to side of the hull. Member 147 and bow 148 are, as shown in Figs. 21 and 22, rectangular in cross section and are connected by the transverse members 149 and 150. A thin plate or board 151 is secured to one side of the members 147 and 148 and extends throughout the full length of said members as well as member 146 at the bottom of the hull. Said plate 151 is strengthened by having secured thereto the V-shaped ribs 152. At the lower part of the hull another plate 153 is secured to the other side of members 147, 148 and member 146. Blocks 154 are disposed between the plates 151 and 153 and are recessed to receive the keelson members 143. Another block 155 is set in between the plates 151 and 153 at the central portion thereof and is recessed to receive the central keel member 142. Spaced stiffening members or battens 156 extend longitudinally of the hull at the outer side of the bulkhead, member 147 being recessed to receive the same. A thin board or sheet 147 is used for the bottom of the hull and a covering 158 of similar material is used for the side of the hull, this covering being secured to the transverse and longitudinally extending members 145 and 146 at the bottom and 147 and 156 at the sides, as well as to members 140, 140a and 141a. The compartment within the sheets 157 and 158 is, of course, absolutely water-tight. The lower sheet 157 extends outward as stated, to member 140a and another sheet 159 is provided, which extends upward from member 140a, being secured to the outer side of member 140a and member 141. Sheet 159 is also secured to the longitudinally extending members 160 and the vertically extending members 161 which are rectangular in cross section, members 161 being recessed to receive the members 160. Transverse partitions 162 extend from the sheet 159 to an inner sheet 163 which is disposed in a vertical plane. Vertical members 161a extend along the outer side of sheet 163 while longitudinally extending members 161b extend along the outer side of sheet 163, being recessed into members 161a. Sheet 163 is secured to members 161a and 161b. Members 161a are secured at their bottoms to member 140a. A top sheet or thin board is disposed over the top of the hull between members 148 and 141, the same being shown as having an opening 164a therein above wheel pocket 167 to accommodate the landing wheels when retracted. The compartment between members 158 and 163 designated 167, forms the wheel compartment into which the wheels are retracted when the plane is on the water, and said compartment is closed at its ends by suitable bulkheads and partitions as indicated by the dotted lines 165 and 166 in Fig. 1. A deflector or deflecting plate 167a is disposed at the rear side of the wheel pocket or compartment 167 and extends across the same. This plate as shown in Figs. 5 and 34 curves upwardly and forwardly from the lower part and rear portion of said pocket or compartment. The bottom of the compartment which forms part of the sheet or covering 157 is in the form of a door 168 hinged by the hinge 169, so as to open downwardly as indicated by dotted lines in Fig. 20. The compartment is arranged to be drained by a siphon tube 170 which, as shown in Figs. 20 and 23, is of inverted U-shape and secured to the inner side of compartment 167 by a clip 171 secured to wall 158. The rear end of the tube 170 is open as indicated at 170a a short distance above the door 168 and the front end is provided with a flange 170b secured to the bottom 157 in the rear of door 168. Said flange surrounds a hole 157a through floor 157 and a spout member 172 has a flange 172a engaging the outer side of sheet 157. This flange and flange 170b are bolted together through floor 157 by headed and nutted bolts 173.

Figures 17, 18, 19:
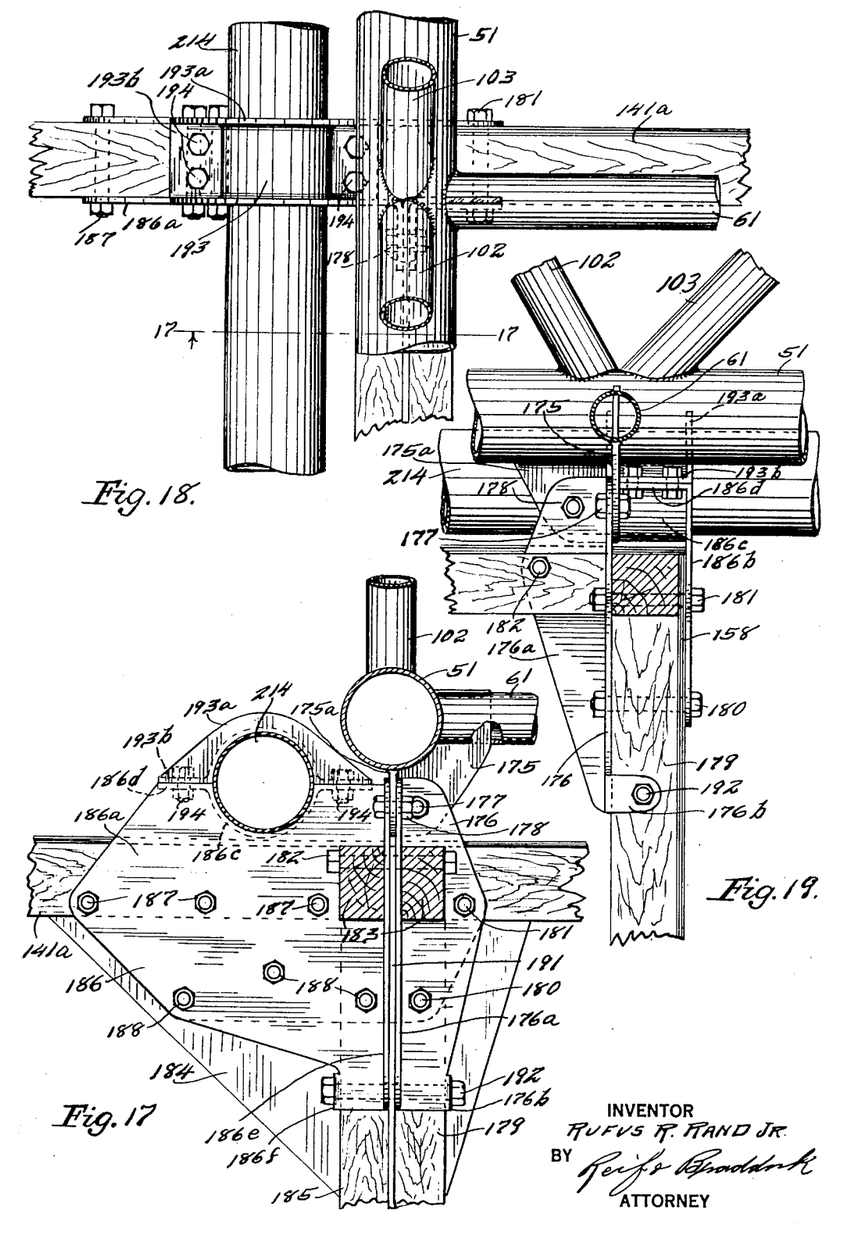
Fig. 17 is a partial section taken on line 17—17 of Fig. 18 which is substantially the same as line 7—7 of Fig. 4.
Fig. 18 is a top plan view of the parts shown in Fig. 17.
Fig. 19 is a view as seen from the right of Fig. 17.

The hull 40 is supported by the frame 55 at four points, namely at the junction of tubes 62 and 53, the junction of tubes 61 and 51 and the junction of tubes 53 and 108 at the ends of member or tube 53. The joint or connection between the frame and hull is shown in Figs. 17 to 19, this being the joint at the junction of tubes 61 and 51 and adjacent the junction of tubes 102 and 103. An angle plate 175 is provided, and this has an upper portion extending through a slit in the tube 61, said plate and tube being welded together. Said plate extends to and around the tube 51 and has a flange 175a at right angles to the axis of tube 61 which extends lengthwise of the tube 51 and is welded thereto. A bracket 176 also in the form of an angle plate is provided, and this has flanges at right angles to each other, one of which engages plate 175 and is connected thereto by the headed and nutted bolt 177 and the other flange 176a of which engages flange 175a and is bolted thereto by the headed and nutted bolt 178. The bracket 176 extends vertically along the vertical member 179 at the inner side of the hull, being bolted through the same and the sheet or covering of the hull 158 by the headed and nutted bolt 180. Said bracket is also bolted through the longitudinally extending member 141a of the hull and the outer sheet by the headed and nutted bolt 181. Flange 176a of the plate 176 is bolted by the headed and nutted bolt 182 through a pair of spaced cross pieces 183 which extend across the top of the hull. Plate 176 also has a lug 176b bent into a plane parallel with the flange 176a but extending in the opposite direction and along the side of a vertical member 179 of the hull similar to the member 147. Another vertical member 185 is shown, spaced slightly from member 179. Another plate 186 is provided, and this plate has a wide flange 186a extending along the inner side of member 141a and secured thereto by headed and nutted bolts 187. Flange 186a is also bolted to the hull by headed and nutted bolts 188 which also extend through a filler block 184. Bolts 187, 188, and bolts 180 and 181 also extend through a flange 186b which is disposed flat against the outer side of the hull and against the sheet or covering 158. The plate 186 has formed thereon a semi-cylindrical portion 186c at the sides of which are flanges 186d, and plate 186 is also bent downwardly at right angles to flange 186d to form flange 186b. Flanges 186a and 186b are thus parallel and as stated, are connected by bolts 180, 181, 187 and 188. Plate 186 also has a flange 186e extending at right angles to flange 186a which is also bolted to flange 175a by the headed and nutted bolt 178. Flange 186b is also bolted to flange 176a by the bolt 182. A filler piece 191 is disposed between flanges 186e and 176a. Flange 186a also has a lug 186f bent parallel to flange 186e but extending oppositely thereto and alongside of vertical member 185, being bolted thereto by the headed and nutted bolt 192 which also extends through member 179 and the lug 176b. A cap member 193 is provided, having a central cylindrical portion and spaced parallel ribs 193a disposed in vertical planes, said cap also having a flange 193b bolted to the flange 186d by the headed and nutted bolts 194.

From the above description it will be seen that the hull is supported from the main truss frame 55 by plate 175 and through plates 176 and 186.

The hull is secured to the rear portion of the frame as shown in Figs. 8 and 8a by bracket 200.

It may be stated that the lugs 113 formed at the ends of the main frame for the attachment of the wing frames are formed of the tubes 113a surrounded by and welded to plates 113b which are set into and welded to the ends of tubes 50, 51, 52 and 53, as shown in Fig. 8a. An angle plate 201 has flanges 201a and 201b at right angles to each other, flange 201b extending through a slit in and being welded to the tube 53 and flange 201a also being welded to tube 53. A bracket 200 has flanges 200a and 200b at right angles to each other, and these are bolted respectively to flanges 201a and 201b by the headed and nutted bolts 202. Flange 200b is also bolted to a rib 203 extending transversely across the top 15 of the hull by the bolt 204 and flange 200a is bolted through a vertical member 205 of the hull by the headed and nutted bolts 206, these bolts also passing through a plate 207 disposed flat against the outer side of the covering of the hull. Plate 200 also has a lug 200c extending at right angles to flange 200a and parallel and in the opposite direction to the flange 200b which engages the side of the vertical member 205 and is bolted thereto by bolt 208. Another bracket 209 is disposed at the side of flange 201b opposite bracket 200 and has a flange 209a shaped similarly to flange 200b and bolt 204 also passes through this flange and another cross rib 210 parallel and adjacent the cross rib 203. Bolt 202 also passes through flange 209a. Bracket 209 has a flange 209b which, like the flange 200a, is bolted by bolts 211 to a vertical rib 212 adjacent rib 205. Bolts 211 also pass through plate 207 which is wide enough to aline with both flanges 200a and 209b. It will be noted that the upper bolts 206 and 211 also pass through a longitudinally extending member 141 at the upper outer corner of the hull. It will thus be seen that the hull is connected to the rear portion of the frame through plate 201 and the plates or brackets 200 and 209. The hull is thus suspended from the main truss frame 55 at four points.

Figures 28, 29, 30, 31, 32:
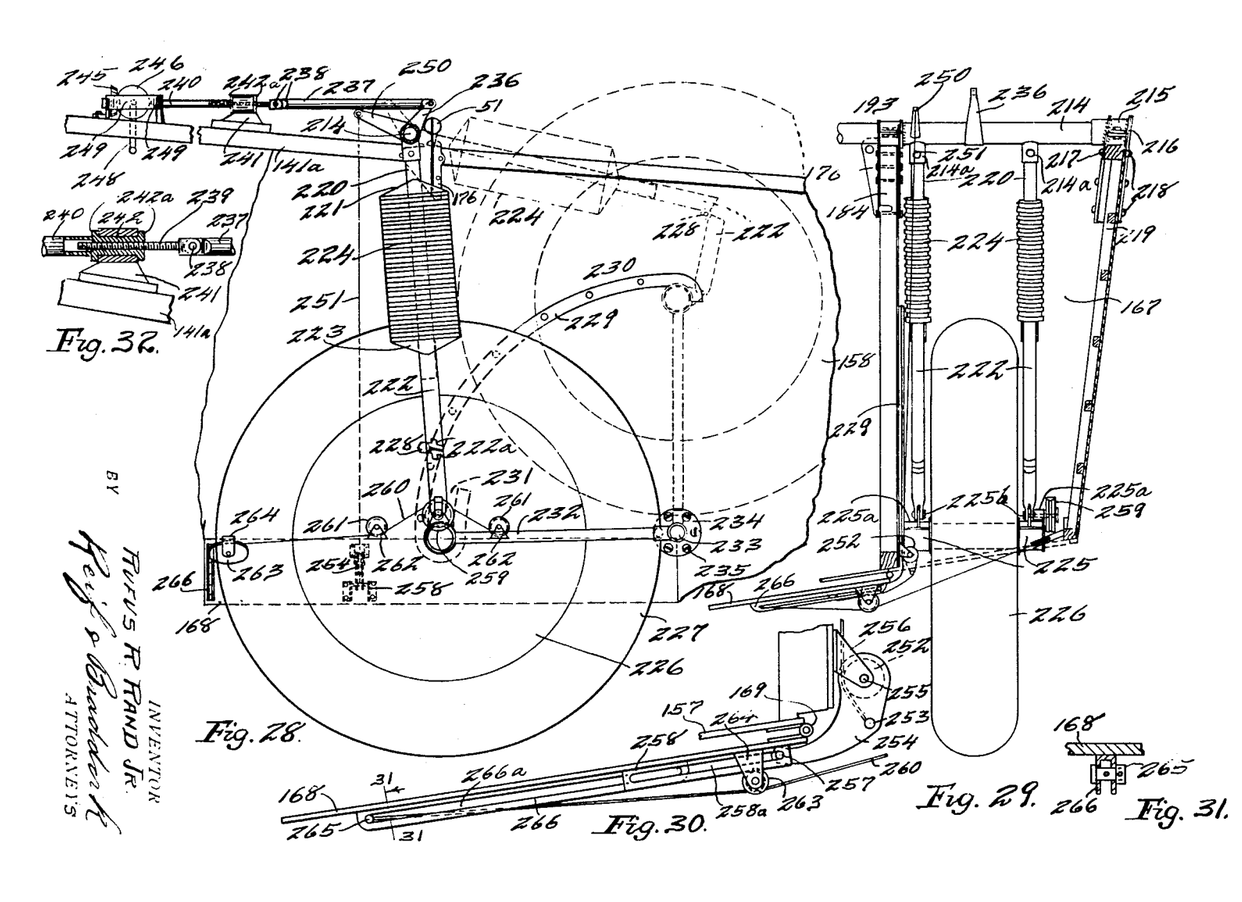
Fig. 28 is a view in side elevation of the wheel retracting mechanism.
Fig. 29 is a view as seen from the right of Fig. 28.
Fig. 30 is a partial view of the parts shown in Fig. 29 shown on an enlarged scale.
Fig. 31 is a vertical section on line 31—31 of Fig. 30, as indicated by the arrow.
Fig. 32 is a view partly in side elevation and partly in vertical section of some of the parts shown in Fig. 28 on an enlarged scale.
Figure 33:
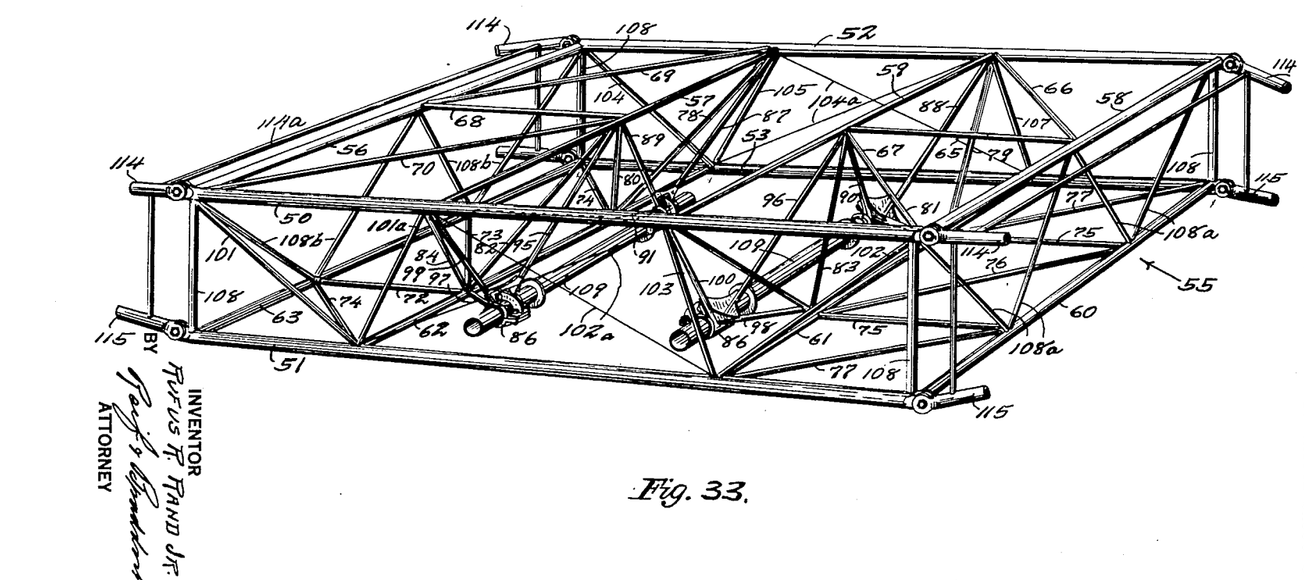
Fig. 33 is a perspective view of the main frame used.

The bearing formed by flange 186c and the cap 193 has journaled therein a tube 214 which extends transversely of the hull as shown a short distance in front of and below the front lower tube 51 of the truss frame 55. It will be understood that there is one of the bearings having the cap 193 at each side of the hull. Shaft 214 is also journaled in a capped bearing 215 welded to plates 216 and 217 which are connected to the hull by the bolts 218 which extend through a vertical member 219 and a filler block 219a as shown in Fig. 29. A landing gear is provided for the plane and this comprises a pair of members 220 in the form of tubes which are bolted at their upper ends to sockets 214a which are welded in turn at their upper ends to tube 214. Members 220 have collars 221 secured thereto, and at their lower ends telescope respectively into tubes 222. The latter tubes have collars 223 secured thereto and between collars 221 and 223 a multiplicity of resilient washers 224 made of rubber or similar material are disposed. Members 222 have secured at their lower ends the bearings 225 in which are journaled the axles of the landing wheels 226 which as usual will be equipped with pneumatic tires 227. Members 222 are shown as bifurcated at their lower ends and bolted to the caps 225a of the bearings 225 which have central ribs welded thereto embraced by the members 222 and connected thereto by headed and nutted bolts 225b. The tubes or members 222 are divided intermediate their ends and the portions thereof connected by the hinge 228, said members having ends 222a adapted to contact when member 222 is in a straight line position. A guide member 229 in the form of an arcuate plate is secured to the inner wall 158 of the wheel compartment 167 by a plurality of spaced screws 230. Said member 229 has its ends curved and at its lower end is reversely bent into U-shape to form a slot 231 and axle bearing 225 has a cylindrical projection receivable in slot 231 and which moves in engagement with the concave edge of plate 229. Said bearing also has secured thereto a rod 232 which is pivoted at its other end on a stud 233 carried in a bearing 234 having a circular flange secured to the inner wall 158 by the screws 235. Member 214 has an arm 236 secured thereto and this arm is pivotally connected at its outer end to a link 237 which is pivotally connected to a screw 239. Screw 239 is threaded into a nut 242 carried in a bearing 241 secured to the longitudinal member 141a. Nut 242 has thrust collars 242a at its ends engaging the ends of bearing 241. Nut 242 is secured in and welded to a tube 240 which extends forwardly to a bracket 249 secured to the forward end of the hull which has bearings for the tube 240. A beveled gear 245 is secured to tube 240 and meshes with another beveled gear 246. Beveled gear 246 is secured to a shaft journaled in bracket 249 which has at its inner side a crank handle 248 by which it can be turned.

With the described construction, it will be seen that when crank 248 which is in position to be conveniently manipulated by the pilot is turned, member 240 and nut 242 will be turned and the thread therein is such that members 240 and 237 will be drawn together or moved apart. This oscillates arm 236 and oscillates the hollow shaft or tube 214. When shaft 214 is oscillated, members 220, 222 and 224 will be swung from the full line position shown in Fig. 28 to the dotted line position shown therein. Bearings 225 will be lifted and the inner bearing will be guided along the concave side of the guide member 229 and will swing about the axis of stud 233 and engage the upper curved end of the guide member 229. In this operation it will be seen that member 222 breaks and swings about the hinge 228 and the wheel 226 is thus moved to the dotted line position and is disposed within compartment 167 and with its bottom above the bottom of said compartment. It will be seen that when the wheels are swung down and are in contact with the ground, that the weight of the plane is transmitted through the main frame 55 and tube 214 to the members 220 and through the resilient members 224 which act as shock absorbers to the wheels 226. The aeroplane is thus supported by the wheels 226 and by the trailer wheel 46.

As stated, the bottom of the wheel compartment is closed by a door 168. A mechanism is provided for opening and closing this door as the wheel is projected or retracted. This mechanism includes an arm 250 secured rigidly to tube 214 so as to oscillate therewith. Arm 250 has secured thereto one end of a cord or cable 251 which extends downward over a pulley 252 and has its end secured at 253 to a curved arm 254 swingable about the pivot 255 carried in a bracket 256 having a flange which is bolted to the inner wall of compartment 167 adjacent the bottom thereof. Arm 254 has a pin 257 at its end rigidly carried therein, and said pin is movable in a slot 258a of a bracket 258 which is secured to the inner side of door 168.

When tube 214 is oscillated to project the wheels 226, arm 236 is swung to pull upon the cable 251. This swings arm 254 about its pivot 255 and pin 257 moving in slot 258a swings door 168 about its hinge 169 to the open position shown in Figs. 29 and 30.

The outer member 222 just above axle 225 has secured thereto a pulley 259. A cord or cable 260 runs over this pulley and under a pair of pulleys 261 disposed at either side respectively of the pulley 259 and carried in small brackets 262 secured to the inner side of the door 168. From pulleys 261 the cord 260 extends over another pulley 263 carried on a bracket 264 secured to the inner side of door 168 and said cord has secured to its end a pin 265 travelling in the elongated slot 266a of bracket 266 secured to the inner side of the door 168 parallel to its end portions. There is a bracket 266 at each end of door 168 and a pin 265 at each end of cord 260, one only being shown.

With the described construction, when member 222 is elevated and moves upward, pulley 259 moves along guide member 229 close to the inner bearing 225. This pulls upward upon cable 260 and the same passing over its various pulleys, pulls upon pins 265. These pins thus exert a closing movement upon door 168. The doors, of course, tend to drop by gravity, and after a short movement from the fully open position shown in Fig. 30, the closing tendency increases and the doors are quickly swung to closed position as pulley 259 moves to its upper position. The door 168 is thus opened and closed and at all times under the control of the cables 251 and 260 as the wheels are projected or retracted.

Should the plane be used without the doors 168, the water would pass somewhat into the compartments as shown in Fig. 34, wherein the water is designated 280. This water will, as the plane is in motion, take a course as indicated and will be deflected out of the compartments by the deflecting plates 167a. Even without the doors, therefore, the compartments will be kept almost free of water when the plane is in motion on the water.

The usual controls for the rudders and ailerons will be located in the cockpit in the customary positions convenient for manipulation by the operator.

The motor 112 is air-cooled and for this purpose a casing indicated by the dot and dash line 270 is provided, (see Figs. 4 and 5) enclosing the motor 112. This casing has an opening 271 in the top of the wing directly in front of the tower 44 shown in Figs. 4 and 5. An opening 272 may also be formed in the front and lower side of one wing at one side of the portion over the hull and this opening is connected by passage 273 with the top and front end of the casing 270. An exhaust passage 274 is provided for casing 270 and this opens in the rear of the tower 44. It will be understood that there is an area of high pressure when the plane is moving, at the points of the openings 271 and 272 and there is an area of low pressure in the rear of the tower at the exhaust opening 274. Air will thus move through casing 270 at high velocity to cool the motor. It may be stated that the exhaust pipes of the motor extend through an outer chamber indicated in Fig. 6 as 275. Air will also pass through this casing to keep the exhaust pipes cool, so that there will be no danger of the same setting fire to the plane.

When the plane alights on the water, the water will enter the compartment 167 substantially to the depth of the draft of the plane, such water being indicated as 276 in Fig. 23. As the plane moves forward on the water after doors 168 are closed, the water will be siphoned out through the pipe 170 as there will be an area of low pressure in the rear of spout 172 and the water will draw through the pipe 170 as indicated by the arrows in Fig. 23.

Figures 35, 36, 37:
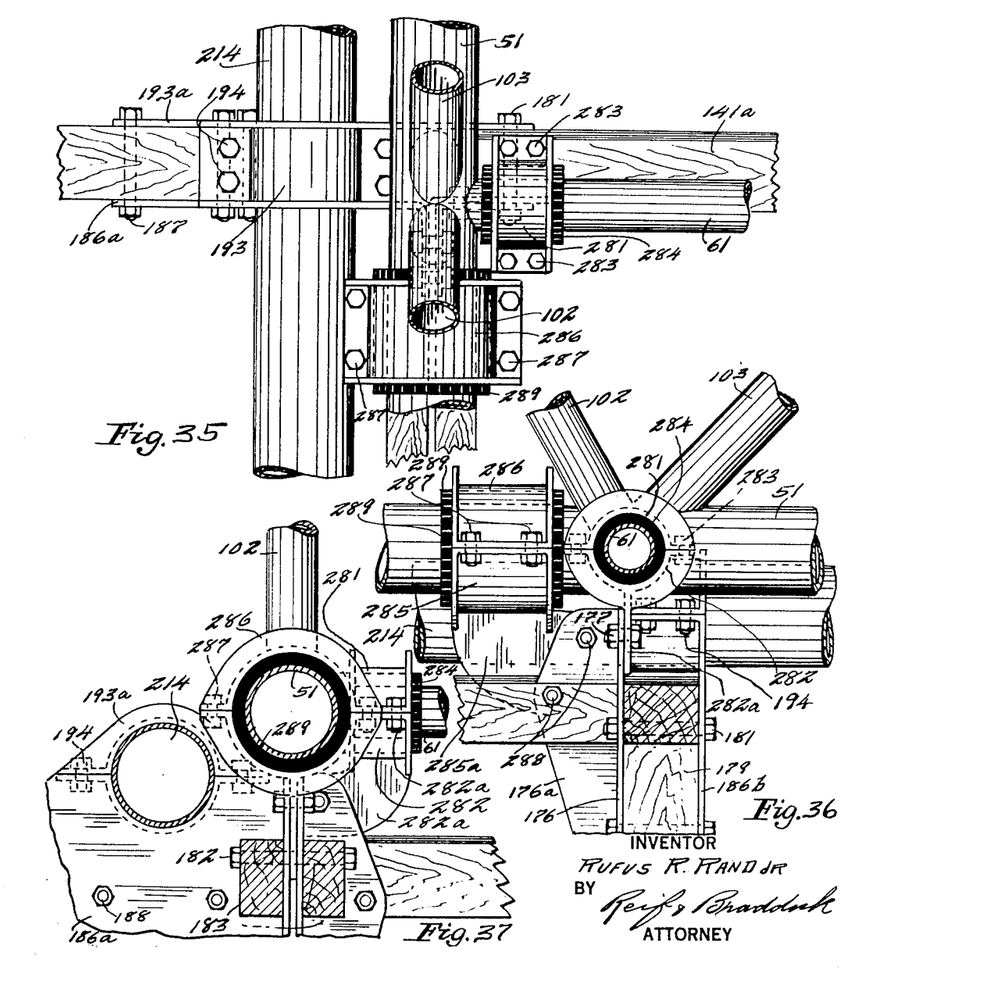
Fig. 35 is a view similar to Fig. 18, showing a resilient support for the hull.
Fig. 36 is a view in elevation as seen from the right of Fig. 35.
Fig. 37 is a view in front elevation of the parts shown in Fig. 35.

In Figs. 35, 36 and 37 a modified form of structure is shown for supporting the hull. In these figures the tubes 102 and 103 are shown connected to tube 51 and tube 61 instead of having the supporting plate 165 welded thereto is enclosed in a cap bearing having the cap 281 and the bearing portion 282. Bearing 282 and cap 281 have mating flanges connected by headed and nutted bolts 283. Bearing portion 282 has a depending plate 282a analogous to the plate 175 shown in Figs. 17 to 19, and this plate has bolted thereto the plate 176, said plates being connected by bolt 177. Bearing 282 and its cap 281 embrace a bushing 284 of resilient material such as rubber, which bushing surrounds tube 61 so that the parts supported by bearing 282 are resiliently supported from tube 61. In place of the plate 175a being welded to tube 51, said tube is embraced by a bearing 285 and its cap 286, said bearing and cap having mating flanges connected by the headed and nutted bolts 287. A plate 285a is integral with the bearing 285 and extends downwardly and laterally therefrom, the same being connected by bolts 288 to flange 176a of bracket 176. Bearing 285 and its cap 286 embrace a resilient bushing 289 of rubber or similar material so that the parts supported by plate 285a are resiliently supported from tube 51. The parts of the hull and brackets connected to the same, as well as the bracket 186 and its cap 193 are the same as shown in Figs. 17 to 19.

In the structure shown in Figs. 35 to 37, the hull is resiliently supported from the frame at its forward end, and similar cap bearings, not shown, with resilient bushings, may be used for supporting the hull from the rear end of the frame. With such a construction, bracket 201 would have its plate 201a secured to a bearing embracing tube 63 and having a cap thereon, and would have its plate 201b secured to a bearing embracing tube 53 and having a cap thereon. Resilient bushings would, of course, embrace tubes 53 and 63 and be embraced by said bearings.

By using the resilient bushings embracing the tubes of the frame, the hull is resiliently supported and any vibration of the frame would be largely absorbed in the resilient bushings so that it would not be transmitted to the hull.

It will be understood that the term "hull" is used herein to mean either the fuselage of a land plane or the body of a flying boat or seaplane.

From the above description it is seen that applicant has provided a novel and very efficient structure of aeroplane. The structure has a high degree of strength with a very small weight and at the same time a rugged and rigid support is furnished for the hull while the motor and attached parts are securely but resiliently supported.

The landing gear is effectively supported from the main frame in a simple and efficient manner. As stated, the plane is constructed and arranged to alight either on land or on the water. When landing on water as above described, the operator will retract the wheels and simultaneously close the doors to the wheel compartments. The wheels are thus not projecting in any way to give a retarding effect, as the hull moves through the water. The hull is shaped to operate efficiently as a boat.

By suspending the motor from the main frame and suspending the hull from the main frame, the center of gravity is brought quite low, the same being located just below the top of the hull proper and forward of the wing center. This gives great stability to the plane. This is of great importance when the plane is in the water, as it practically eliminates the tendency of the plane toward lateral instability. It is unnecessary, therefore, to have wing floats at the wing tips. When flying, the low center of gravity gives a pendulum effect, affording great stability. The compact concentrated loads make the plane easy to maneuver. When landing, the location of the center of gravity relative to the wheels and the disposition of the hull relative to the wheels prevent the plane from nosing over.

The location of the propeller is such that there is practically no interference with the propeller action and the flow of air through the propeller is smooth and unobstructed, giving an increased efficiency. It will be noted that by locating the propeller rearwardly of the pilot and passengers, there is no slip-stream from the propeller to strike the passengers in the face and with the present location of the propeller, there is no slip stream blast over the fuselage. The absence of the slip stream blast over the fuselage, which occurs when the propeller is at the nose of the plane, greatly reduces the air resistance on the hull. The propeller being in the rear of the pilot and passengers, there is no obstruction in front of the pilot seat and perfect visibility can be had forward, sideward and downward. The absence of projecting parts also enables the plane to have an attractive and ornamental appearance. This also greatly reduces air resistance. It may be mentioned that the space within the sides of the frame 55 will be used to carry oil and gas as well as baggage and the batteries. Any radio equipment can also be carried by this frame.

The plane can also be maneuvered readily. The concentrated weight including the motor, oil and gas, as well as the pilot and the passengers, are massed in a comparatively small space or volume. This makes it easier to swing the plane in flight.

It will also be noted that there are no appreciable stresses on the hull. The wing stresses and stresses due to the concentrated loads are taken by the central frame 55. The resilient mounting of the motor prevents the vibration from the motor and power plant being transmitted positively to the frame and the rest of the aeroplane.

The fact that the center of gravity of the plane is quite low, makes it possible to have the wheels much closer together. With the low center of gravity and the wheels close together, there is a very small tipping moment. Having the wheels close together also makes it possible to retract the wheels into the hull.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:—

1. An aeroplane structure having in combination, a central frame having groups of members in three planes, the longitudinal central axis of members of said groups converging at approximately one point, a hull having groups of frame members, disposed in three planes intersecting at one point, and means connecting said frame and hull substantially at said points respectively.

2. An aeroplane structure having in combination, a central trunk portion, a main frame of truss formation disposed in said trunk portion including a group of three truss members, the central axis of which converge substantially to a common point, a hull and means connecting said hull to said frame closely adjacent said point, said hull having frame members intersecting adjacent said means and being suspended from said frame.

3. An aeroplane structure having in combination, a central trunk portion, a main frame of truss formation disposed in said trunk portion including a group of three truss members, the central axis of which converge substantially to a common point, a hull, means connecting said hull to said frame closely adjacent said point, said truss frame comprising four of said groups having said three members in each, said hull being connected to said frame adjacent each of said four groups, two of said groups being at one side of said hull and two at the other side of said hull.

4. An aeroplane structure having in combination, a central wing section, a main central frame of truss construction and of substantially rectangular form within said section, separate side wing sections extending at each side of said frame having wing frames therein secured to said main frame, a hull independent of said main frame except that it is suspended therefrom, a motor suspended from said main frame independently of said hull and disposed principally within said hull, a propeller supported above said central wing section and means for driving said propeller from said motor.

5. An aeroplane structure having in combination, a central wing section, a main central frame of truss construction and of substantially rectangular form in outline disposed within said wing section, separate side wing sections at each side of said central wing section having wing frames therein secured to said main frame, a hull disposed below said central wing section and main frame and independent of said main frame except that it is suspended therefrom, a motor suspended from said main frame independently of said hull and disposed principally within said hull, an auxiliary frame of truss formation secured to said main frame, a propeller mounted on said auxiliary frame and means for driving said propeller from said motor.

6. The structure set forth in claim 5, said auxiliary frame extending upwardly above said central wing section, a tower extending from the top of said central wing section and enclosing said auxiliary frame, the same being stream-lined longitudinally of said aeroplane and said propeller being at the rear and upper end of said tower.

7. An aeroplane structure having in combination, a central wing section, a main central frame of truss construction and of general rectangular shape within said section, separate side wing sections extending at either side of said central frame having wing frames therein secured to said main frame, a hull independent of said main frame except that it is suspended therefrom, said main frame having a motor-supporting portion adjacent its bottom, a motor suspended at a plurality of points from said portion and disposed principally below said frame and principally in said hull, a propeller mounted above said main frame and means for driving said propeller from said motor.

8. An aeroplane structure having in combination, a central wing section, a main central frame of truss construction and of general rectangular shape disposed within said wing section, separate side wing sections disposed at either side of said central section having wing frames therein secured to said main frame, a hull independent of said main frame except that it is suspended therefrom, said main frame including forwardly and rearwardly extending spaced members, a motor detachably secured to and suspended from said members and disposed principally below said main frame, an auxiliary frame of truss construction supported rigidly on said members and extending upwardly therefrom above said central wing section, a propeller carried by said auxiliary frame and means for driving said propeller from said motor.

9. An aeroplane structure having, in combination, a central wing section, a main central frame of truss construction and of general rectangular shape within said section, separate side wing sections at either side of said central section having wing frames therein secured to said main frame, a hull independent of said main frame except that it is suspended therefrom, said hull being resiliently carried by and insulated from said main frame and disposed below said frame and central wing section, a motor independent of said hull resiliently suspended from and insulated from said main frame and disposed principally within said hull, a propeller above said central wing section and means for driving said propeller from said motor whereby stresses from said hull and motor are transmitted to said main frame, a shock absorbing means is provided between said hull and frame and between said motor and frame and there is no electrical path between said motor and frame.

10. An aeroplane structure having in combination, a central wing section, a main central frame of truss construction and of substantially rectangular form within said section, separate side wing sections extending at each side of said frame having wing frames therein secured to said main frame, a hull independent of said main frame except that it is suspended therefrom and below the same, said main frame including two pairs of longitudinally spaced bearings, spaced forwardly and rearwardly extending motor-supporting members received in said pairs of bearings respectively and a motor suspended from said members having bearings enclosing said members, said motor being disposed principally in said hull, said first mentioned bearings including removable cap portions, said supporting members being removable upwardly when said cap portions are removed.

11. The structure set forth in claim 10 and a unitary rigid auxiliary frame of truss formation rigidly connected to said motor-supporting members and extending above said central wing section, a propeller mounted at the top of said auxiliary frame and means for driving said propeller from said motor.

RUFUS R. RAND, Jr.